F. E. QUEENEY.
BATTERY CRADLE SUPPORTING MECHANISM FOR VEHICLES.
APPLICATION FILED OCT. 3, 1913.
1,112,321.  Patented Sept. 29, 1914.
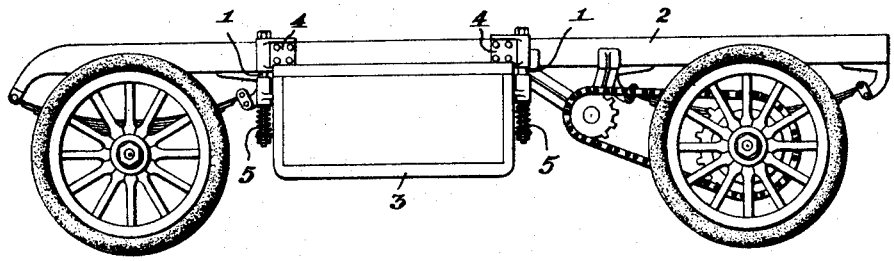
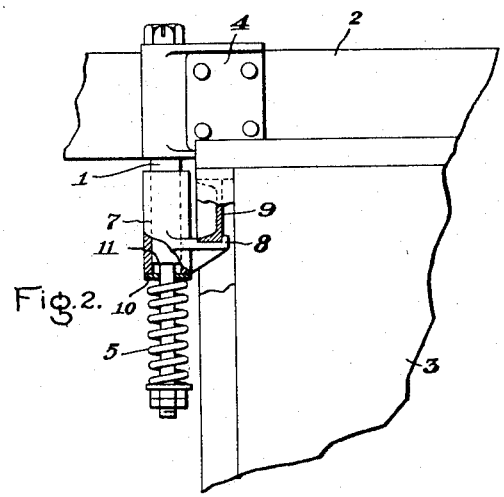
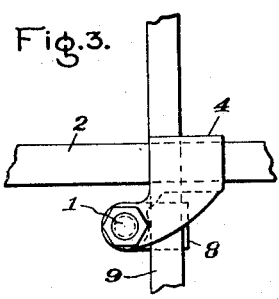 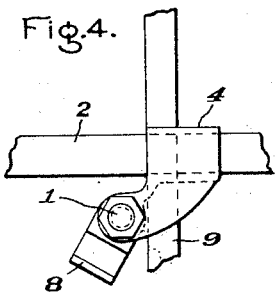
WITNESSES.
INVENTOR.
FRANK E. QUEENEY
BY
HIS ATTORNEY.

UNITED STATES PATENT OFFICE.

FRANK E. QUEENEY, OF NEW YORK, N. Y., ASSIGNOR TO GENERAL VEHICLE COMPANY, INCORPORATED, A CORPORATION OF NEW YORK.

BATTERY-CRADLE-SUPPORTING MECHANISM FOR VEHICLES.

1,112,321.  Specification of Letters Patent.  Patented Sept. 29, 1914.

Application filed October 3, 1913. Serial No. 793,133.

*To all whom it may concern:*

Be it known that I, FRANK E. QUEENEY, a citizen of the United States, residing at New York, county of New York, State of New York, have invented certain new and useful Improvements in Battery-Cradle-Supporting Mechanisms for Vehicles, of which the following is a specification.

My invention relates to means for supporting the battery cradles of vehicles and the object of my invention is to provide a resilient support for such a cradle which will allow its ready attachment and detachment to and from the vehicle. I do this by attaching vertical members to the frame of the vehicle adjacent the ends of the cradle, guiding thereby other spring supported vertically movable members each provided with a projection or hook portion which may be rotated into and out of engagement with the battery cradle.

My invention will be better understood from the following detailed description of a construction in which it is embodied.

In the accompanying drawings, which form a part of this specification, Figure 1 is a side elevation of an automobile chassis, showing the cradle supporting means; Fig. 2 is a side elevation of one of the supports and a part of a cradle, portions being broken away; and Figs. 3 and 4 are plan views of one of the supports showing it engaged with and disengaged from the battery cradle.

A number of round downwardly extending rods 1 are attached by brackets 4 to the frame 2 of the vehicle adjacent the ends of the battery cradle 3. These extend along the ends of the cradle and preferably, as illustrated, are four in number, two adjacent each end of the cradle. About the lower end of, and attached to each rod, is a spring 5 carrying a washer 10. Each rod 1 is provided with a shoulder 11 located approximately as shown, to limit the upward movement of the washer. Surrounding each rod and resting on the washer 10 is a sleeve 7 provided with a projecting or hook portion 8. The sleeve 7 may both slide and rotate on the rod. The battery cradle 3 is provided with a perforation for each hook member 8, allowing the hook members to engage under the members 9 of the frame of the battery cradle as shown in Fig. 2.

To attach the cradle 3 to the battery: The cradle is brought under the vehicle and the sleeves 7 and their hook portions 8 are rotated out of the path of movement of the cradle as shown in Fig. 4. The cradle is then raised into position and the sleeves and their hook portions, which may be depressed as necessary, are rotated to the position shown in Figs. 2 and 3, that is, until the hook portions 8 engage under the members 9. Now when the cradle is released it is carried on the springs 5 through the hook portions 8 and the sleeves 7. The jolting to which the vehicle is subjected in operation is transmitted to the battery cradle through these springs only in a diminished degree, the sleeves 7 sliding up and down on their rods 1.

The cradle may be removed by raising it until the cross member 9 touches, or nearly touches, the frame member 2. The springs 5 cause the sleeves 7 to follow the motion of the cradle until the washers 10 engage with the shoulders 11 when their pressure is removed from the sleeves 7. Sufficient room is provided to then allow the rotation of the sleeves 7 and their projecting portions 8 out of engagement with the members 9.

It will be understood that this description is of but one possible construction involving my invention and that my invention is not limited to this construction alone but that my invention is defined by the following claims.

What I claim as new and desire to secure by Letters Patent of the United States, is,—

1. A battery cradle supporting mechanism for vehicles comprising vertical members attached to the frame of the vehicle adjacent the ends of the cradle, a spring surrounding and attached at its lower end to the lower end of each of said vertical members, and a rotatable hook member for engaging the battery cradle carried on the upper end of each spring, said hook member being adapted to be rotated into and out of engagement with the battery cradle.

2. A battery cradle supporting mechanism for vehicles comprising vertical members attached to the frame of the vehicle adjacent the ends of the cradle, a rotatable and vertically movable hook member for engaging the battery cradle guided in its movements by each of said vertical members, and a spring carrying each of said hook members, said hook members being adapted to be rotated into and out of engagement with the battery cradle.

3. A battery cradle supporting mechanism for vehicles comprising vertical rods depending from the frame of the vehicle adjacent the ends of the cradle, a spring surrounding and attached at its lower end to the lower end of each of said rods, and a sleeve carrying a hook portion slidable on and rotatable about each vertical rod and supported by the spring thereon whereby said hook portion may be rotated into and out of engaging position.

4. The combination with a vehicle and a battery cradle of means for attaching the cradle to the vehicle comprising depending members carried by the frame of the vehicle, springs carried by the depending members, and hooks carried by said springs and guided in their movements by said depending members, said hooks being adapted to be turned into and out of engagement with the cradle.

In witness whereof, I have hereunto set my hand this thirtieth day of September, 1913.

FRANK E. QUEENEY.

Witnesses:
I. HOWELL,
H. E. KLINE.